(12) United States Patent
Harris

(10) Patent No.: US 8,604,922 B2
(45) Date of Patent: Dec. 10, 2013

(54) PROGRAMMABLE TAILLIGHT ILLUMINATION SYSTEM

(76) Inventor: Glen Harris, South Portland, ME (US)

( * ) Notice: Subject to any disclaimer, the term of this patent is extended or adjusted under 35 U.S.C. 154(b) by 550 days.

(21) Appl. No.: 12/823,445

(22) Filed: Jun. 25, 2010

(65) Prior Publication Data
US 2010/0327747 A1 Dec. 30, 2010

Related U.S. Application Data

(60) Provisional application No. 61/220,400, filed on Jun. 25, 2009.

(51) Int. Cl.
B60Q 1/26 (2006.01)
B60Q 1/52 (2006.01)

(52) U.S. Cl.
USPC .......... 340/468; 340/471; 340/472; 340/478; 340/479; 362/499; 362/541; 362/800

(58) Field of Classification Search
USPC ....................................................... 340/468
See application file for complete search history.

(56) References Cited

U.S. PATENT DOCUMENTS

| | | | |
|---|---|---|---|
| 4,928,084 A * | 5/1990 | Reiser ............................ | 340/479 |
| 5,905,434 A * | 5/1999 | Steffan et al. ................. | 340/464 |
| 6,478,458 B2 * | 11/2002 | Hickman ....................... | 362/473 |
| 6,526,680 B1 * | 3/2003 | Yu ................................... | 40/204 |
| 6,897,771 B1 * | 5/2005 | Lodhie et al. ................. | 340/479 |
| 2003/0156038 A1 * | 8/2003 | Hankins et al. ........... | 340/815.45 |

* cited by examiner

Primary Examiner — Donnie Crosland
(74) Attorney, Agent, or Firm — Grossman Tucker Perreault & Pfleger, PLLC

(57) ABSTRACT

A motor vehicle taillight comprising a frame configured to be removably mounted to a vehicle, a housing coupled to the frame, a plurality of light emitting diode (LED) positioned along the frame, and a programmable electronic system configured to received an input signal and to selectively provide power to the at least one sets of LED arrays based on a program selected by a user and received input signal. The programmable electronic system is also configured to be selectively placed into a program mode upon activation of a switch, and when in the program mode, to select one of the plurality of programs based on at least one of a turn signal or brake signal of the motor vehicle.

27 Claims, 4 Drawing Sheets

PROGRAMMABLE TAILLIGHT ILLUMINATION SYSTEM

CROSS-REFERENCE TO RELATED APPLICATIONS

This application claims the benefit of U.S. Provisional Patent Application Ser. No. 61/220,400 filed Jun. 25, 2009 and entitled PROGRAMMABLE TAILLIGHT ILLUMINATION SYSTEM which is fully incorporated herein by reference.

BACKGROUND

The present disclosure relates to a motor vehicle lighting system, in particular, to a programmable lighting system for a motor vehicle.

Traditionally, an incandescent tungsten light bulb has been the light source used in motor vehicle lighting systems, including signaling and marking lights. More recently, however, light-emitting diodes (LEDs) are starting to be used for motor vehicle brake lights and turn signals because of their long service life, vibration resistance, and fast switching times. LED-based lights are often held at constant intensity, however, factors such as flash pattern and intensity of the light can be important in attracting attention when operating a motor vehicle. LED-based lights have the capability to be programmed with a wider variety of flash patterns because of their ability to be switched directly by electronics. Therefore, designs that can enhance these features will be readily implemented by the industry.

BRIEF DESCRIPTION OF DRAWINGS

The subject matter of the present disclosure is set forth by description of embodiments consistent therewith, which description should be considered in combination with the accompanying drawings, wherein.

DETAILED DESCRIPTION

Figure 1:
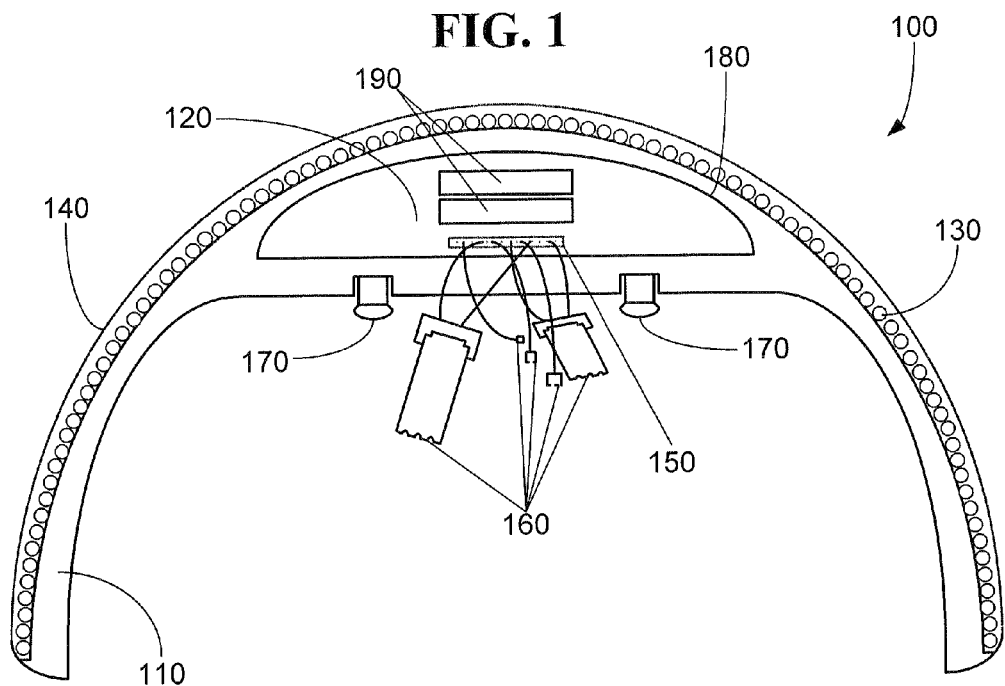
FIG. 1 provides a top view of a taillight incorporating the system of the present disclosure.

The subject matter of the present disclosure may involve, in some cases, interrelated products, alternative solutions to a particular problem, and/or a plurality of different uses of a single system or article.

The lighting system of a motor vehicle may comprise lighting and signaling devices mounted or integrated to the front, sides and/or rear of the vehicle. The purpose of this system is to provide illumination for the driver, other drivers, and/or by-standers in order to operate the vehicle safely, particularly in low light conditions such as nighttime, to increase the conspicuity of the vehicle, and to display information about the vehicle's presence, position, size, direction of travel, and driver's intentions regarding direction and speed of travel.

Vehicle conspicuity to the rear may be provided by one or more taillights that may incorporate rear position lights (also called running lights). Rear position lights may be wired such that they are lit (i.e., illuminated) whenever the headlights are illuminated. Rear position lights may be combined with, or separate from, the vehicle's brake lamps (also called brake lights). Brake lights may include steady-burning rear lights and may be brighter than the rear position lights. Brake lights may be activated when the driver applies the vehicle's brakes. In combined-function installations, the taillights may produce brighter red and/or orange light for the brake light function, and dimmer red and/or orange light for the rear position light function. The rear position and brake light functions may be produced separately and/or by a dual-intensity lamp.

Light-emitting diodes (LEDs) may provide long service life, extreme vibration resistance, and can permit considerably shallower packaging compared to most bulb-type assemblies. The use of LEDs may also provide styling advantages because LEDs are capable of forming much thinner lights than incandescent lamps. LEDs may also offer a significant safety performance benefit when employed in brake lights, for when power is applied they rise to full intensity faster than incandescent bulbs. This fast rise time not only improves the conspicuity of the brake light, but also provides other drivers with increased time in which to react to the appearance of the brake lights.

LED-based lights may be held at a constant intensity, however, factors such as flash pattern and intensity of the light can be important in attracting attention when operating a motor vehicle. LED-based lights may have the capability to be programmed with a wider variety of flash patterns because of their ability to be switched directly by electronics.

The subject system may include several driver-controlled inputs based on the model of motor vehicle which may control one or more operations or functions of the lights. These inputs may include the brake signal, the turn signal blinker, the reverse signal, and the running light. Each of the signals may activate one or subsystem which controls LED arrays.

More specifically, the brake signal may be off until the brake is activated by the driver. Once the brake signal is activated, the brake light subsystem may be activated. This subsystem will provide a flow of electrical current to illuminate at least one set of LED arrays corresponding to the area on the taillight designated for the brake light. When the brake signal is deactivated, the subsystem may stop and/or reduce the flow of current to the LED array (for example, but not limited to, to turn off the LED array).

The turn signal light may be off until the turn signal is activated by the driver. Once the turn signal is activated, the turn signal light subsystem may be activated. This subsystem may sequentially initiate the flow of electrical current to illuminate at least one set of LED arrays corresponding to the area on the taillight designated for the turn signal light. The arrays designated for the turn signal may illuminate as well as turn off with every pulse of the turn signal. When the turn signal is deactivated, the subsystem may stop and/or reduce the flow of current to the LED array (for example, but not limited to, to turn off the LED array).

Depending on the model of the motor vehicle, the running lights may be handled somewhat differently. When the running light is activated, at least one set of LED arrays will be at least partially illuminated. These arrays may or may not be the same arrays used as the brake light. In the case that the running light arrays are the same arrays used in the brake light, when the brake system is activated, the running light arrays may illuminate from partial brightness to full brightness.

Turning now to FIG. 1, one embodiment of a top view of a light system 100 (for example, but not limited to a taillight) is generally illustrated. A frame 110 may be configured to be removably mounted, secured or otherwise coupled to a motor vehicle. A housing 120 may be located on and/or within a portion (e.g., a top portion) of the frame 110. An electronic circuitry 150 may be positioned within the housing 120. The electronic circuitry 150 may be in electrical communication with a plurality of LEDs 130 (for example, but not limited to, one or more sets or arrays of LEDs) and may be configured to control the operation or function of LEDs 130. Consistent with at least one embodiment herein, some of LEDs 130 may be positioned along an outer portion of the frame 110. An outer lens 140 may optionally be affixed, coupled, or otherwise secured to an outer portion of the frame 110 and the lens 140 may cover the LEDs 130 and/or may provide a watertight enclosure.

Figure 2:
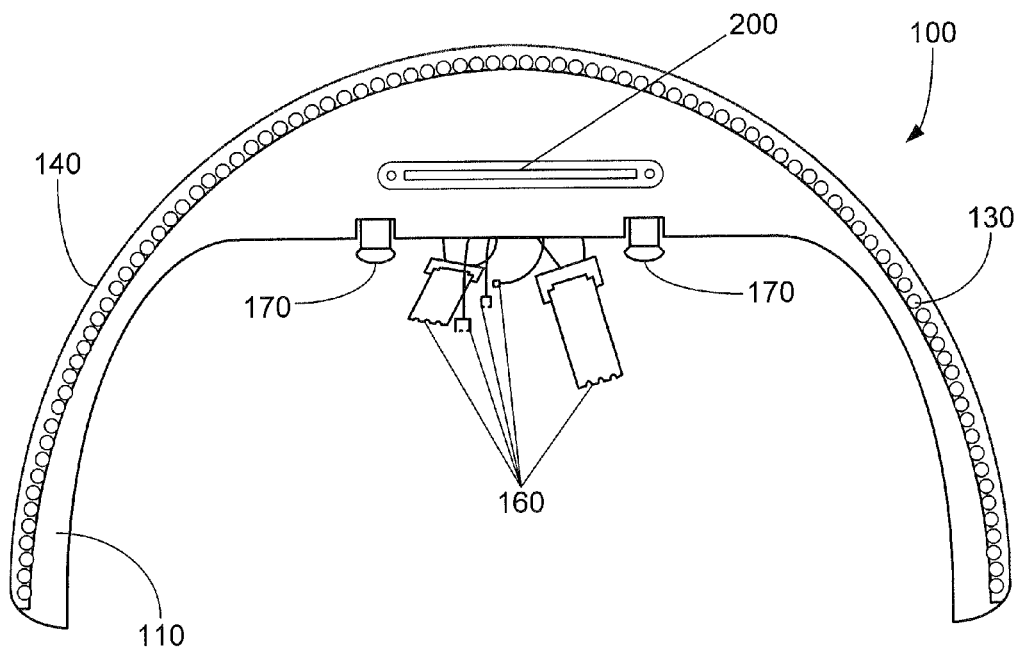
FIG. 2 provides a top view of the underside of the taillight of FIG. 1.

Original equipment manufacturer (OEM) connectors 160 may be coupled to and extend from the electronic circuitry 150 to provide a "Plug and Play" installation with a legacy motor vehicle lighting system. Ballast resistors 190 may be incorporated into the electronic circuitry 150 to allow the system 100 to function properly with a legacy motor vehicle light system which was not designed to function with an LED based system by providing an overall resistance suitable with the legacy motor vehicle light system. Mounting brackets 170 may be coupled to the frame 110 to allow the taillight 100 to be removably mountable to a vehicle. FIG. 2 provides a top view of the underside of the taillight 100 of FIG. 1. As shown in FIG. 2, a license plate light 200 may be positioned on the underside of the frame 110.

In one aspect of the present disclosure, for example as generally illustrated in FIG. 1, the electronic circuitry 150 may be enclosed within the housing 120 and encapsulated with a polymer 180, ensuring a waterproof environment, as well as protection from vibration. The polymer 180 may be composed of materials that are impervious or substantially impervious to elements encountered while operating a vehicle such as, but not limited to, water and debris (dirt, dust, pollen, salt, detergents and the like). The polymer 180 may be made from either natural or synthetic materials such as polymers and/or co-polymers. Examples include polyurethane, nylon (polyamides), polyester, polyethylene, polypropylene, PVC, fluoroplastics, block copolymers, polyethers and composites thereof.

The frame 110 may be composed of materials that are suitable for automotive use. For example, the frame 110 may be made from either natural or synthetic materials such as carbon, fiberglass, and/or metal alloys. The frame 110 may also be machined, cast, or extruded. The outer lens 140 may be composed of materials that are durable, transparent or translucent, and colored or clear. The frame 110 may be made from either natural or synthetic materials such as polymers and/or co-polymers. Examples include polyurethane, nylon (polyamides), polyester, polyethylene, polypropylene, PVC, fluoroplastics, block copolymers, polyethers and composites thereof.

Figure 3:
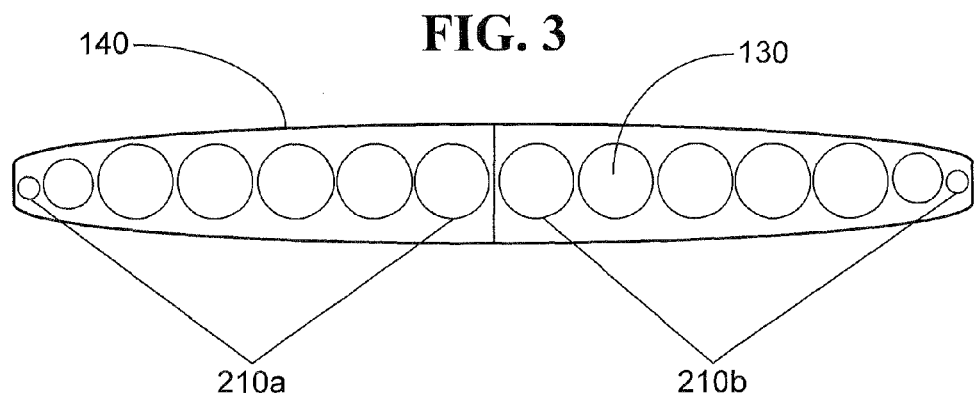
FIG. 3 provides a side view of an embodiment of a taillight incorporating the system of the present disclosure that illustrates an arrangement of at least two sets of LED arrays.
Figure 4:
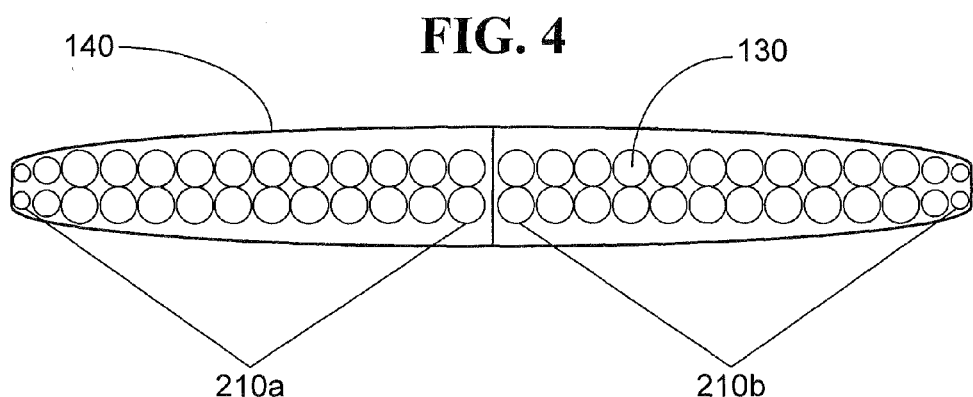
FIG. 4 provides a side view of another embodiment of the taillight incorporating the system of the present disclosure that illustrates an arrangement of at least two sets of LED arrays.
Figure 5:
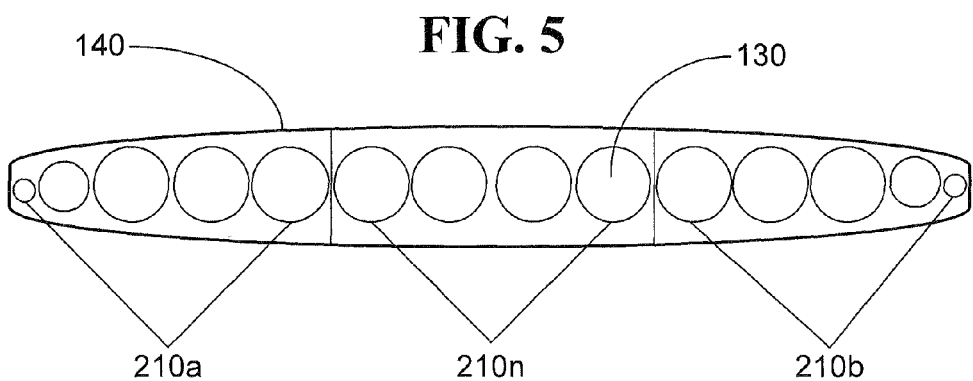
FIG. 5 provides a side view of another embodiment of a taillight incorporating the system of the present disclosure that illustrates at least two sets of LED arrays.

Turning now to FIGS. 3-5, several embodiments of the taillight 100 shown in FIG. 1, illustrating the positioning of the LEDs 130 enclosed by the lens 140. As shown in FIGS. 3-5, the LEDs 130 may function as the main brake, turn signal, and/or rear position lighting. In one embodiment, as shown in FIG. 3, at least two sets of LED arrays 210a-210b may be positioned on the outer portion of the frame 110. A first set of LED arrays 210a may be positioned on a left side of the taillight 100 (when viewed from the top) and may function as the left turn signal lighting. A second set of LED arrays 210b may be positioned on a right side of the taillight 110 and may function as the right turn signal lighting. The LED arrays 210a-210b may also function as the rear position lighting (also called running lights), as well as the brake light 100. In another embodiment, as shown in FIG. 4, the number of LEDs 130 in the sets of LED arrays 210a-210b may be increased, for example, by providing LED arrays 210a-210b having two or more rows.

In another embodiment, as shown in FIG. 5, at least 3 sets of LED arrays 210a-210n may be positioned along the outer portion of the frame 110. A first set of LED arrays 210a may be positioned on a left side of the taillight 100 and may function as the left turn signal lighting. A second set of LED arrays 210b may be positioned on a right side of the taillight 100 and may function as the right turn signal lighting. As can most clearly be seen in FIG. 5, a third set of LED arrays 210n may be positioned in the center of the taillight 100 and may function as the running light and/or brake light. However, all LED arrays 210a-210n may function as the running light and/or brake light.

Figure 6:
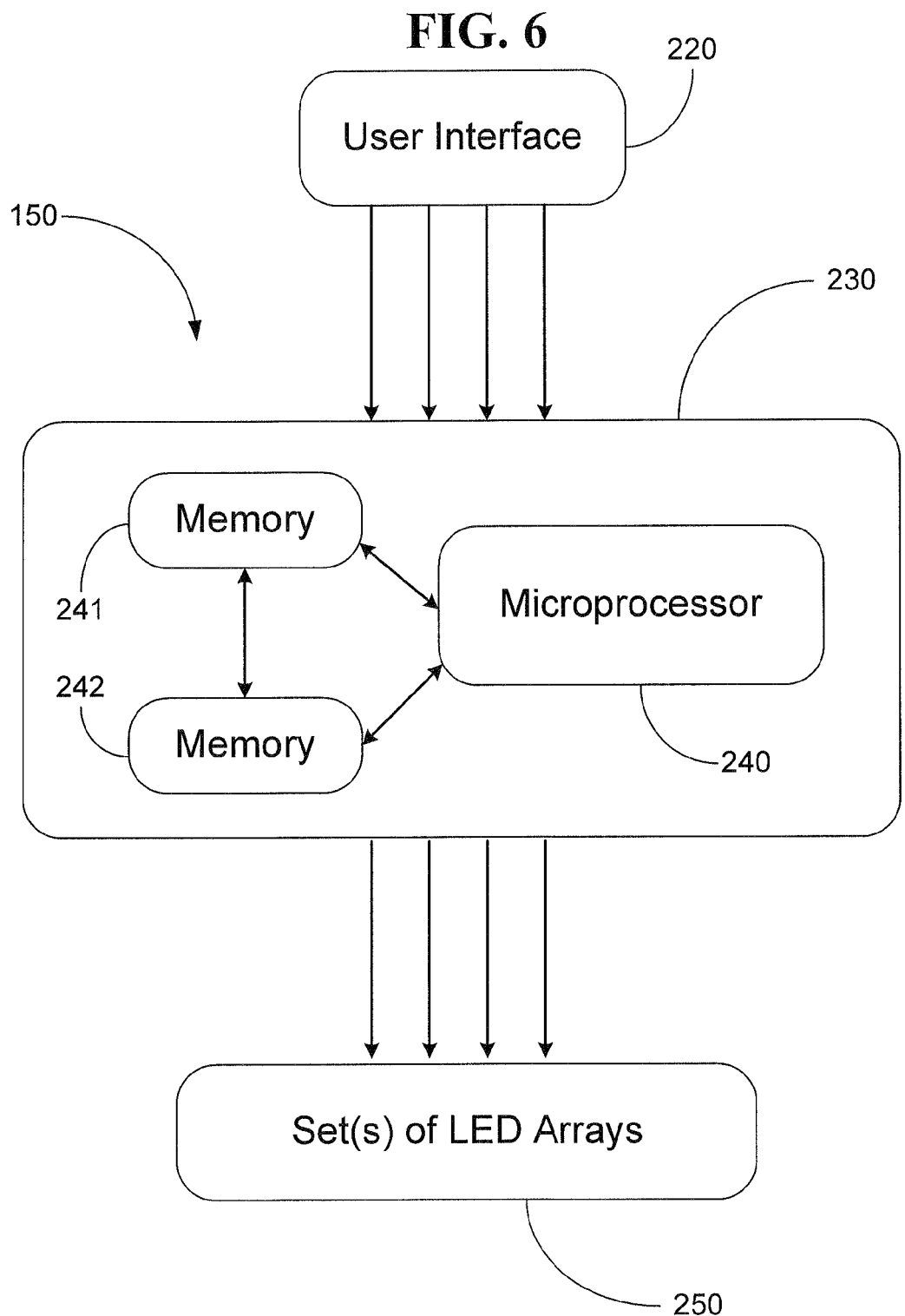
FIG. 6 provides a schematic representation of an embodiment of an electronic system incorporating the system of the present disclosure that illustrates a microprocessor controller circuit.

FIG. 6 provides a schematic representation one embodiment illustrating an exemplary electronic circuitry 150. The embodiment illustrated in FIG. 6 is intended only be an illustrative embodiment. Those of ordinary skill in the art will appreciate that the functions of the electronic circuitry described herein may be performed using various other embodiments. Additionally, the electronic circuitry may be part and/or separate from the taillight 100 (e.g., the housing 120). According to at least one embodiment, the user interface 220 may be configured to generate input signals, such as the brake signal, turn signals (also called blinker signals), and rear position (also called running lights) signals. The input signals may be received and interpreted by a controller 230. In one embodiment, the controller 230 may receive individual input signals by way of multiple ports. In other embodiments, the controller 230 may receive the input signals by way of a multiplexer. As shown in FIG. 6, the controller 230 may include a microprocessor 240 and memory units 241 and 242. In other embodiments, a microcontroller may be used, in place of a microprocessor. In one embodiment, memory unit 241 may be used store a program and memory unit 242 may be used to store instructions and settings from the input signals. The microprocessor 240 may also be programmed to trigger individual outputs based on a function of the inputs (for example, but not limited to, based on a look-up table stored within memory 241). The outputs may be used to activate individual power transistors, powering sets of LED arrays 250, allowing any sequential illumination of LED arrays if desired. The programmable feature of the electronic circuitry 150 design may allow different illumination and deactivating sequences.

The microprocessor 240 may be provided voltage, compatible with its internal circuitry, by way of a voltage-regulated circuit. The voltage-regulated circuit may be designed and sized to provide adequate power during all phases of LED operation. The microprocessor 240 may be of the type to utilize internal memory units 241 and 242. The memory units 241 and 242 may not require any external application of voltage to store and subsequently retrieve program features and functions. For example, program features that have been changed by the user may be stored and remain to be the default settings, regardless of power being applied and/or removed from the controller 230 until at the features are "reprogrammed" by the user.

In one embodiment, separate or combined input signals from the brake, the turn signal, and the rear position light may be used by the electronic circuitry 150 to activate controller subsystems to illuminate and deactivate at least two separate sets of LED arrays located within at least two separate portions of the taillight 100. For example, the electronic circuitry 150 may be programmed to illuminate and deactivate LEDs in an LED array corresponding to a brake light area on the taillight. For example, the electronic circuitry 150 may be programmed to illuminate and deactivate LEDs in an LED array corresponding to a turn signal area on the taillight module. For example, the electronic circuitry 150 may be programmed to illuminate and deactivate LEDs in an LED array corresponding to a rear position light on the taillight element.

In another embodiment, separate or combined input signals from the turn signal may be used to by the electronic circuitry 150 activate a controller subsystem to sequentially illuminate and deactivate at least two separate sets of LED arrays located within at least two separate portions of the taillight. Individual outputs may be triggered sequentially based on the input signals. For example, the electronic circuitry 150 may be programmed to sequentially illuminate and deactivate LEDs in an LED array corresponding to a turn signal area on the taillight. In one embodiment, the LEDs in the LED array corresponding to the turn signal area are deactivated in the same sequential order as they were sequentially illuminated. In another embodiment, the LEDs in the LED array corresponding to the turn signal area are deactivated in a different sequential order than they were illuminated.

Figure 7:
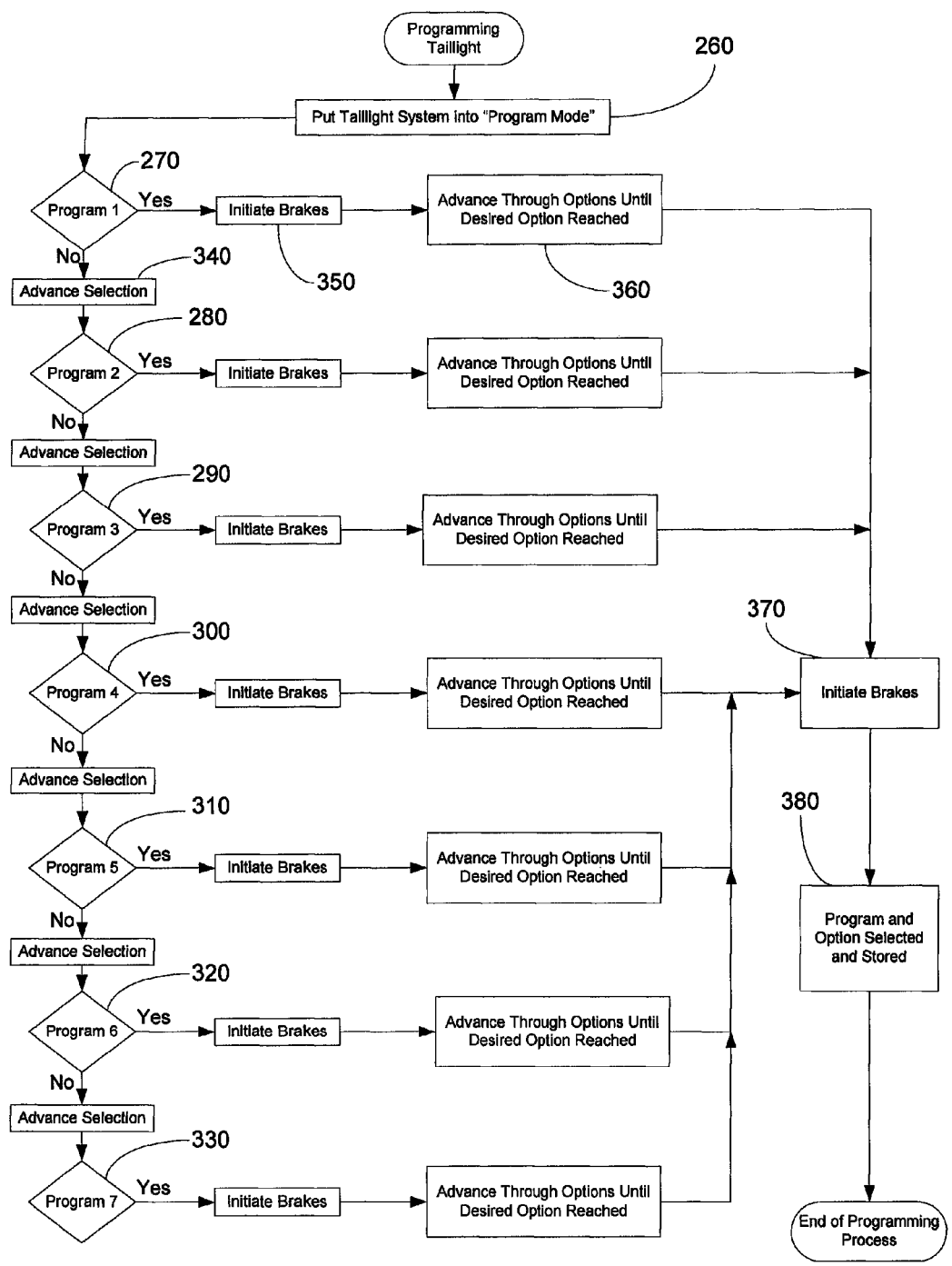
FIG. 7 provides a method of manually programming a taillight incorporating the system of the present disclosure.

Turning now to FIG. 7, a method in which a user (for example, an operator of the motor vehicle) may selectively program a taillight incorporating the system of the present disclosure is generally illustrated. In order to manually program the system of the present disclosure, a user may place the system into "Program Mode" 260. In one embodiment, the "Program Mode" 260 may be achieved by turning on the power to the motor vehicle and/or triggering a switch associated with the electronic circuitry 150 (for example, but not limited to, triggering a magnetic switch (e.g., a hall effect switch) or the like using a magnetic field). At least one set of LED arrays may flash at least once indicating that the system is in "Program Mode" 260. Once in "Program Mode" 260, the system may initiate the program item menu, in which the user may select a desired program 270-330.

In one embodiment, the program item menu may start with a default program. For example, the default program (first program item) in the menu is the rear position lights (also called running lights) program 270. In other embodiments, the default program in the program item menu can differ between programs. In order to select a program from the program item menu, the user may use the turn signals and brakes associated with the legacy motor vehicle light system. In order to advance through program items 340, the user may initiate the right turn signal and then cancel the right turn signal using the right turn signal cancel feature. This may result in advancing to the next consecutive program item in the menu. In order to decrease to previous program items in the menu, the driver may initiate the left turn signal and then cancel the left turn signal using the left turn signal cancel feature, resulting in retreating to previous program items in the menu. Each time the turn signal is initiated and canceled, at least one set of LED arrays may flash the number of times corresponding to the program item number in the menu, indicating what program is currently recognized.

When the user reaches the desired program from the program item menu, the program may be selected when the user initiates the brakes of the motor vehicle 350. At least one set of LED arrays may flash the number of times corresponding to the program item number in the menu, indicating what program has been selected.

After selecting a program, the user may choose a specific option for the program, such as speed, pattern, and intensity of the corresponding light. In order to choose an option for a selected program item, the user may use the turn signals and brakes associated with the legacy motor vehicle light system. In order to advance through options 360 in the option menu, the user may initiate the right turn signal and then cancel the right turn signal using the right turn signal cancel feature, resulting in advancing to the next option item in the menu. In one embodiment, the option menu for each program may start with a default option. In other embodiments, the default option in the option menu may differ between options. In order to decrease to previous options in the menu, the user may initiate the left turn signal and then cancel the left turn signal using the left turn signal cancel feature. This may result in retreating to previous options in the menu. Each time the right turn signal is initiated and canceled, at least one set of LED arrays may flash the number of times corresponding to the option number in the menu, indicating the option has been recognized.

When the user reaches the desired option, the option may be selected when the driver initiates the brakes of the vehicle 370. In one embodiment, once the brakes have been initiated 370, all sets of LED arrays may flash indicating the specific option of the desired program has been selected and stored 380 into the electronic system. In other embodiments, at least one set of LED arrays may flash with a distinctive pattern indicating the selection and storage of program options.

In one embodiment, the default program may be a running lights program 270, which allows the user to control whether the running lights will be on or off. The programs that consecutively follow may include a four way flasher pattern program 280, which allows the driver to select at least one pattern, a turn signal (also called blinker) program 290, which allows the driver to select at least one pattern, a turn signal (Blinker) speed program 300, which allows the driver to select from multiple speeds, a number of brake light flashes program 310, which allows the driver to select the number of flashes prior to the brake light illumination, a rate of flashes of brake light program 320, which allows the driver to select the rate at which the brake lights flash prior to brake light illumination, and a running light program 330, which allows the user to controls the intensity of the running lights. In other embodiments, the list of programs may exist in a variety of arrangements.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the present disclosure described herein. It is, therefore, to be understood that the foregoing embodiments are presented by way of example only and that, within the scope of the appended claims and equivalents thereto, the present disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A motor vehicle taillight comprising:
    a frame configured to be removably mounted to a vehicle;
        a housing coupled to the frame;
        at least two sets of light emitting diode (LED) arrays positioned along the frame; and
        a programmable electronic system configured to receive an input signal and to selectively provide power to said at least one sets of LED arrays based on one of a plurality of programs selected by a user and said input signal, wherein said programmable electronic system is configured to be selectively placed into a program mode upon activation of a switch, and wherein said programmable electronic system is further configured, when in said program mode, to select one of said plurality of programs based on at least one of a turn signal or brake signal of said motor vehicle.

2. The taillight set forth in claim 1, further comprising an outer lens covering the LED arrays and affixed to the frame.

3. The taillight set forth in claim 1, further comprising a license plate light coupled to the frame.

4. The taillight set forth in claim 1, wherein an inner portion of the frame is removably mountable to the motor vehicle.

5. The taillight set forth in claim 1, wherein the LED arrays are formed by a plurality of LEDs.

6. The taillight set forth in claim 2, wherein the outer lens is configured to fit an outer portion of the frame to form a watertight enclosure.

7. The taillight set forth in claim 2, wherein the outer lens is clear, red, or orange, and acts to both color emitted light and act as a reflector.

8. The taillight set forth in claim 1, wherein the electronic system is sealed within the housing.

9. The taillight set forth in claim 7, wherein the electronic system is encapsulated by a polymer, thereby protecting the electronics from the elements and vibration.

10. The taillight set forth in claim 1, further comprising integrated ballast resistors to mimic original motor vehicle blinker load.

11. The taillight set forth in claim 1, further comprising at least one connector including an original equipment manufacturer (OEM) connectors providing "Plug and Play" installation.

12. The taillight of claim 1, wherein said switch comprises a magnetic switch.

13. The taillight of claim 1, wherein said switch comprises a hall effect switch.

14. The taillight of claim 1, wherein said input signal includes a brake signal.

15. The taillight of claim 1, wherein said input signal includes a turn signal.

16. The taillight of claim 1, wherein said programmable electronic system is configured, when in said program mode, to select one of said plurality of programs based on a first turn signal, a second turn signal, and a brake signal of said motor vehicle.

17. The taillight of claim 1, wherein said plurality of programs are arranged in a program order, and wherein said programmable electronic system is configured, when in said program mode, is configured to advance to a next program in said program order upon receiving a first turn signal and is configured to advance to a previous program in said program order upon receiving a second turn signal.

18. The taillight of claim 1, wherein said programmable electronic system is configured, when in said program mode, is configured to select a desired one of said plurality of programs upon receiving said brake signal.

19. A taillight comprising:
    a frame configured to be removably mounted to a vehicle;
    a plurality of light emitting diodes (LEDs) coupled to said frame; and
    a programmable electronic system configured to selectively provide power to said plurality of LEDs based on one of a plurality of programs selected by a user and an input signal received from said vehicle, wherein said programmable electronic system is configured to be selectively placed into a program mode upon activation of a switch, and wherein said programmable electronic system is further configured, when in said program mode, to select one of said plurality of programs based on at least one of a turn signal or brake signal of said motor vehicle.

20. The taillight of claim 19, wherein said switch comprises a magnetic switch.

21. The taillight of claim 19, wherein said switch comprises a hall effect switch.

22. The taillight of claim 19, further comprising at least one integrated ballast resistor to mimic original vehicle blinker load.

23. The taillight of claim 19, wherein said input signal includes a brake signal.

24. The taillight of claim 16, wherein said input signal includes a turn signal.

25. The taillight of claim 19, wherein said programmable electronic system is configured, when in said program mode, to select one of said plurality of programs based on a first turn signal, a second turn signal, and a brake signal of said motor vehicle.

26. The taillight of claim 19, wherein said plurality of programs are arranged in a program order, and wherein said programmable electronic system is configured, when in said program mode, is configured to advance to a next program in said program order upon receiving a first turn signal and is configured to advance to a previous program in said program order upon receiving a second turn signal.

27. The taillight of claim 19, wherein said programmable electronic system is configured, when in said program mode, is configured to select a desired one of said plurality of programs upon receiving said brake signal.

* * * * *